April 15, 1958 L. SOLBERG 2,830,782
TILTABLE DRIP STAND
Filed July 12, 1954 2 Sheets-Sheet 1
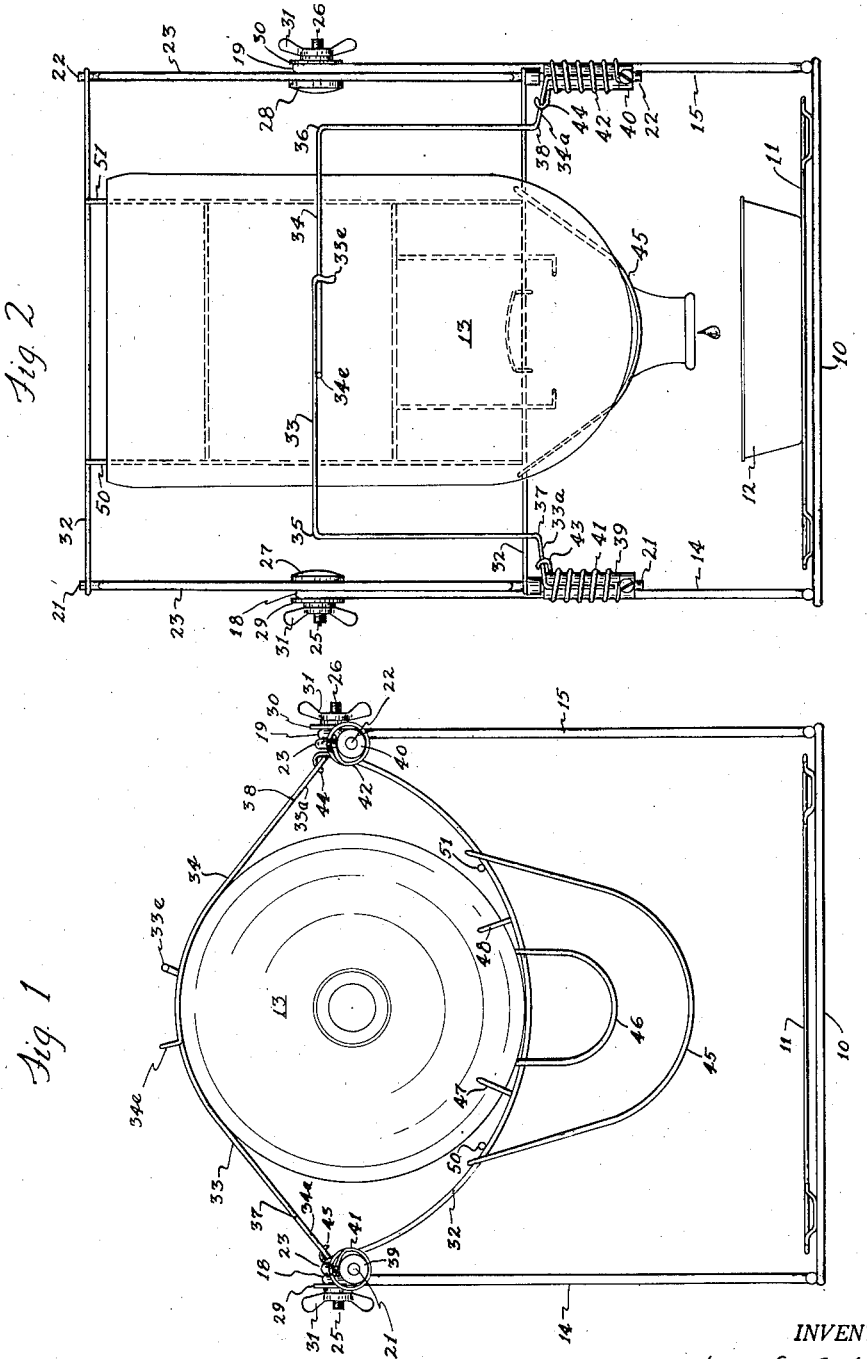
INVENTOR.
Leif Solberg
BY
Greek Wells
Atty.

April 15, 1958
L. SOLBERG
2,830,782
TILTABLE DRIP STAND
Filed July 12, 1954
2 Sheets-Sheet 2
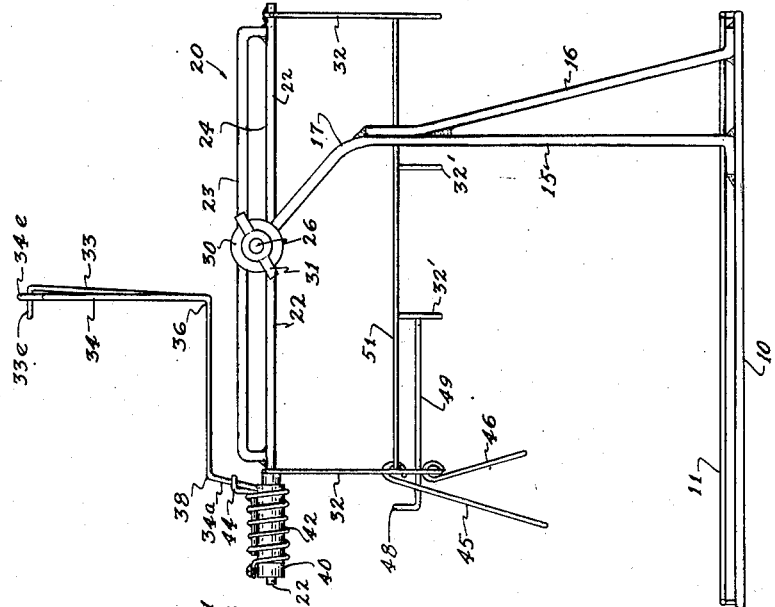
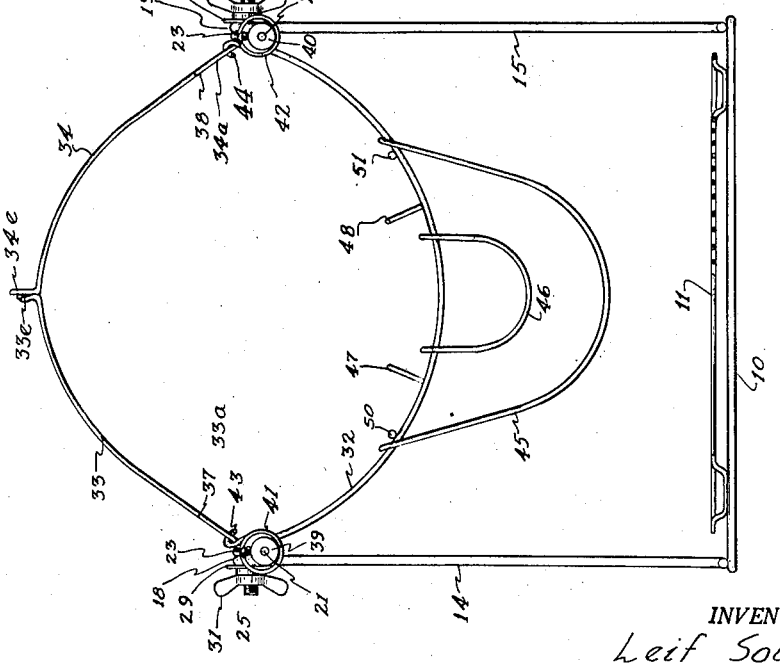
INVENTOR.
Leif Solberg
BY
Greek Wells
Atty.

United States Patent Office 2,830,782
Patented Apr. 15, 1958

2,830,782
TILTABLE DRIP STAND

Leif Solberg, Samuels, Idaho

Application July 12, 1954, Serial No. 442,667

4 Claims. (Cl. 248—141)

My invention relates to an improved drip stand. In restaurants and similar places where it is necessary to empty a multiplicity of receptacles such as syrup cans, jugs of salad dressing, bottles of cream and the like, the operator must lose a certain amount of these somewhat viscous material, or provide some means by which they can be drained without some one waiting and holding the receptacle while it drains. If an employee must wait and hold the receptacle, the loss in time for the employee usually exceeds the saving in material by far. It is the purpose of the present invention to provide a drip stand for the use explained above which is readily adaptable to a variety of sizes and shapes of receptacles and which provides adequate support for the receptacle and a catch pan or dish to recover the material drained from the receptacle.

More specifically it is the purpose of my invention to provide a drip stand having a cradle to receive the receptacles of various sizes and shapes, the cradle being movable about a central axis from horizontal to vertical position, together with receptacle clamps, automatically separable, to clamp various sizes of receptacles to the cradle, and end stops for the receptacle to prevent endwise movement when the receptacles are turned up into draining position.

It is also a purpose of my invention to provide a device of this character wherein the several parts are of open rod construction so that they may be readily cleaned and inspected to maintain proper sanitary conditions.

The nature and advantages of my invention will appear more fully from the following description and the accompanying drawings illustrating a preferred form thereof. It should be understood, however, that the drawings and description are illustrative only and are not intended to limit the invention except insofar as it is limited by the claims.

In the drawings:

Figure 1 is a face view showing my invention with a large jug in place thereon preparatory to being up-turned for drainage;

Figure 2 is a view like Figure 1 but showing the parts with the jug up-turned in drainage position;

Figure 3 is a view of the drip stand in normal emptying position ready to receive any size of receptacle with a dotted line position of the clamps as they would appear on a small receptacle indicated; and Figure 4 is a view in side elevation of the drip stand.

Referring now in detail to the drawings, my improved drip stand utilizes a rectangular base 10 which is made of a light weight rod material such as steel rod plated with a suitable anti-corrosion plating such as chrome plate. The rectangular frame 10 is provided with a wire tray 11 of similar material to receive a dish 12 or other suitable catch basin for collecting the drip from receptacle 13.

Two uprights 14 and 15 are provided on the frame 10 adjacent one end thereof. These uprights are braced by braces 16 and are bent as indicated at 17 to extend over the mid portion of the frame 10. Each upright is made of the same type of rod as the base 10 and has its upper end bent to form a loop 18 on the upright 14 and a loop 19 on the upright 15. A cradle 20 for the receptacles is made up of two side rods 21 and 22, each of which has a bar 23 welded thereto at its ends and spaced therefrom between its ends to provide a slot 24 for the clamping bolts 25 and 26. The clamping bolts 25 and 26 have heads 27 and 28 that engage the rods 21 and 22 and the bars 23. Washers 29 and 30 are provided around the bolts adjacent to the loops 18 and 19 and wing nuts 31 are used to clamp the parts between the heads 27 and 28 and the washers 29 and 30. This construction provides a friction grip pivotal connection between the upper ends of the uprights 14 and 15 and the cradle 20. The side rods 21 and 22 of the cradle are connected by curved cross rods 32, there being two of these cross rods. The side rods 21 and 22 extend beyond the front rods 32 and serve as mounts for two clamp arms 33 and 34. These clamp arms 33 and 34 are curved as shown in Figure 3 and offset as indicated at 35 and 36 and extended forwardly to another offset at 37 and 38, and then downwardly and outwardly to sleeves 39 and 40 that are mounted on the free ends of the side bars 21 and 22. The sleeves 39 and 40 have coiled springs 41 and 42 thereon and these coiled springs are wound in such a direction that their hooked free ends 43 and 44 engage the outwardly extending portions 33a and 34a of the clamp arms 33 and 34.

The springs 41 and 42 normally urge the clamp arms 33 and 34 downwardly toward the curved cross rods 32 so as to hold the receptacle 13 against the cross rods. In order to position the clamp arms 33 and 34 out of the way while a receptacle is being put in place in the cradle 20, I provide the cross arm 34 with an up-turned end 34e and I provide the cross arm 33 with an upwardly and laterally turned end 33e. As illustrated in Figure 3, the end 33e and the end 34e are at right angles to each other so that they may be used as stops to keep the arms 33 and 34 raised when they are not to be used for clamping.

As a further means of adapting the drip stand to accommodate a great variety of receptacles, I provide the front rod 32 with two pivoted yokes 45 and 46, one within the other, both yokes being pivoted upon the front cross rod 32. Two stop fingers 47 and 48 are turned up in front of the front rod 32 from rods 49 that extend between the front rod 32 and an intermediate cross rod 32'. The cradle includes two lower longitudinal rods 50 and 51 that extend between the cross rods 32 and support the intermediate cross rods 32'.

It is believed that the foregoing detailed description is sufficient to show the construction of my improved drip stand. The way in which the drip stand holds a receptacle is best illustrated in Figures 1 and 2. Here a large jug is shown as the receptacle 13. The jug is laid in the cradle 20 as illustrated in Figure 1 and the arms 33 and 34, which are somewhat yielding, are then moved at their tips to disengage the end 33e from the end 34e so that the arms 33 and 34 press down on the receptacle 13. The yoke 45 is swung over the neck of the receptacle 13 as it is moved into position on the cradle 20. The cradle 20 can then be swung against the friction of the connections provided by the bolts 25 and 26 and the associated parts so as to place the receptacle in the proper position for drainage as illustrated in Figure 2. There is no spreading of the dripping material around because the receptacle can be loaded into the cradle 20 without tipping its open end down and then moved into drain position when everything is ready. Smaller bottles can be held in position by the arms 33 and 34 being lowered farther into the cradle. The small yoke 46 can be used to prevent them dropping out endwise. When a can that has no neck to receive one of the yokes 45—46 is being drained, the stop fingers 47 and 48 cooperate with the cradle 20 and the arms 33 and 34 to secure the can in place.

It is believed that the nature and advantages of my invention will be clear from the foregoing description.

Having thus described my invention, I claim:

1. A drip stand comprising a base frame, two upright support rods fixed to said frame and spaced apart to receive a cradle therebetween for holding a receptacle to be drained, a cradle, frictional grip pivot means mounting the cradle on said rods, said cradle comprising two side members, each composed of a lower rod and an upper bar parallel to each other and joined to each other at the ends of the upper bar receiving the pivot means therebetween, and a bottom portion having cross rods connecting the lower rods of said side members at the ends of the upper bars and curved downwardly between the side members, clamp arms pivoted on the side rods and having curved clamping portions extending crosswise of the cradle, spring means urging said arms toward the cradle bottom, and said front cross bar having receptacle stops thereon to hold the receptacles when the cradle is tipped up on said pivot means.

2. A drip stand comprising a base frame, two upright supports fixed to said frame and spaced apart to receive a cradle therebetween, a cradle between said uprights, said cradle comprising side members and a bottom receptacle receiving portion suspended from said side members, frictional grip pivot means mounting the side members on said uprights whereby the cradle may be adjusted between horizontal and upright position, clamp arms pivoted on the side members and extending crosswise over the bottom portion intermediate the ends thereof, spring means on the side members urging said clamp arms toward the bottom portion of the cradle, and said clamp arms having stop members at their free ends, manually engageable with each other when the clamp arms are raised, to keep the arms from swinging toward the bottom portion of the cradle.

3. A drip stand comprising a base frame, two upright support rods fixed to said frame and spaced apart to receive a cradle therebetween for holding a receptacle to be drained, a cradle, frictional grip pivot means mounting the cradle on said rods, said cradle comprising two side members, each composed of a lower rod and an upper bar parallel to each other and joined to each other at the ends of the upper bar receiving the pivot means therebetween, and a bottom portion having cross rods connecting the lower rods of said side members at the ends of the upper bars and curved downwardly between the side members, clamp arms pivoted on the side rods and having curved clamping portions extending crosswise of the cradle, spring means urging said arms toward the cradle bottom, and a yoke pivoted on the front cross bar to hook over the neck of a bottle in said cradle.

4. A drip stand comprising a base frame, two upright support rods fixed to said frame and spaced apart to receive a cradle therebetween for holding a receptacle to be drained, a cradle, frictional grip pivot means mounting the cradle on said rods, said cradle comprising two side members, each composed of a lower rod and an upper bar parallel to each other and joined to each other at the ends of the upper bar receiving the pivot means therebetween, and a bottom portion having cross rods connecting the lower rods of said side members at the ends of the upper bars and curved downwardly between the side members, clamp arms pivoted on the side rods and having curved clamping portions extending crosswise of the cradle, spring means urging said arms toward the cradle bottom, and a yoke pivoted on the front cross bar to hook over the neck of a bottle in said cradle, one clamp arm having an upturned end and the other clamp arm having an upwardly and laterally turned end, said ends being manually engageable to keep the arms from swinging toward the bottom portion of the cradle.

References Cited in the file of this patent

UNITED STATES PATENTS

| | | |
|---|---|---|
| 600,464 | Webster et al. | Mar. 8, 1898 |
| 715,287 | Paine | Dec. 9, 1902 |
| 882,231 | Brown | Mar. 17, 1908 |
| 932,344 | Starbard | Aug. 24, 1909 |
| 1,742,041 | Mangold | Dec. 31, 1929 |
| 1,791,005 | Shepard | Feb. 3, 1931 |
| 2,060,170 | Buck et al. | Nov. 10, 1936 |
| 2,536,419 | Brunell et al. | Jan. 2, 1951 |
| 2,554,875 | Okunami | May 29, 1951 |